US 6,735,181 B1

(12) United States Patent
Babitch

(10) Patent No.: US 6,735,181 B1
(45) Date of Patent: May 11, 2004

(54) WIRELESS TRANSCEIVER WITH SUBTRACTIVE FILTER COMPENSATING BOTH TRANSMIT AND RECEIVE ARTIFACTS

(75) Inventor: Daniel Babitch, Santa Clara, CA (US)

(73) Assignee: Atmel Corporation, San Jose, CA (US)

( * ) Notice: Subject to any disclaimer, the term of this patent is extended or adjusted under 35 U.S.C. 154(b) by 832 days.

(21) Appl. No.: 09/603,801

(22) Filed: Jun. 26, 2000

(51) Int. Cl.[7] .................................................. H04B 3/20
(52) U.S. Cl. ........................ 370/290; 375/219; 375/376; 375/375; 455/24
(58) Field of Search ................................ 370/290, 317, 370/278, 277, 276, 497, 204, 205, 212; 375/219, 220, 221, 295, 306, 375, 376; 455/19, 23, 24, 63, 180.3, 259, 260, 264, 265

(56) References Cited

U.S. PATENT DOCUMENTS

| 3,931,575 A | 1/1976 | Amoroso, Jr. ............... 325/17 |
| 3,935,533 A | 1/1976 | Amoroso, Jr. ............... 325/20 |
| 5,444,737 A | 8/1995 | Cripps et al. ............... 375/219 |
| 5,493,583 A | 2/1996 | Cripps ........................ 375/219 |
| 5,533,056 A | 7/1996 | Cripps ........................ 375/286 |
| 5,550,865 A | 8/1996 | Cripps ........................ 375/295 |
| 5,603,113 A | * 2/1997 | De Loe, Jr. ............... 455/234.1 |
| 6,125,268 A | * 9/2000 | Boesch et al. ............ 455/168.1 |
| 6,516,023 B1 | * 2/2003 | Kveim et al. ............... 375/219 |

FOREIGN PATENT DOCUMENTS

WO  WO 85/02734  6/1985

* cited by examiner

*Primary Examiner*—Phirin Sam
(74) *Attorney, Agent, or Firm*—Thomas Schneck

(57) ABSTRACT

A wireless transceiver featuring a compensating filter circuit with a frequency and optionally an amplitude response which has the same function as the composite of filter effects from the transmit side as well as from the intermediate frequency (IF) stage of the receive side. The compensating filtering approximately duplicates the effects of the phase lock loop on the transmit side and the effects of IF filtering on the receive side, as well as amplitude distortion in the detector, which would delay or distort the audio. Then, the compensated audio is added or subtracted, depending on phase considerations, from the receive signal so that the receive signal is free of filter artifacts.

12 Claims, 3 Drawing Sheets ptionally an amplitude compensator which approximately duplicates the filtering effects of the phase lock loop circuitry on a modulated VCO on the transmit side of the transceiver and the effects of IF filtering on the receive side which would delay and distort the receive signal. Then, the compensator signal is added or subtracted, depending on phase, from the receive signal at the baseband audio level so that the receive signal is free from transmit echo artifacts. In the absence of the compensation filter, the subtraction of the transmit echo is much less effective, or almost absent in some cases.

The utility of the transceiver of the present invention has nearly the minimum RF circuitry which can satisfy most governmental (FCC) requirements for cordless telephones, while having good audio quality.

WIRELESS TRANSCEIVER WITH SUBTRACTIVE FILTER COMPENSATING BOTH TRANSMIT AND RECEIVE ARTIFACTS

TECHNICAL FIELD

The invention relates to wireless data transceivers. More particularly, the invention relates to wireless data and voice transceivers with full duplex functionality provided by frequency division multiplexing.

BACKGROUND ART

Cordless and cellular phones are designed to carry voice modulation of adequate quality for distances from a few hundred feet up to a few miles for cell phones. It is desirable to provide phones that accomplish this while being low cost, having adequate battery life and meeting regulatory requirements on radio emissions. The use of direct transmit and single conversion receive is one of the simplest architectures with a single local oscillator that meets these goals.

In the prior art, U.S. Pat. Nos. 5,493,583; 5,533,056; and 5,550,865 to Cripps and U.S. Pat. No. 5,444,737 to Cripps et al., describe a direct transmit, single conversion receive architecture in a wireless data transceiver. The wireless data transceiver functions for transmitting and receiving frequency modulated (FM) signals. The transceiver has a single oscillator which serves as both the radio frequency source for the transmitter and the local oscillator signal source for the receiver. During signal transmission, the oscillator output is frequency modulated to provide an FM transmit signal to the transmit antenna. The oscillator output is frequency modulated by modulating an error feedback signal which serves as the control voltage for a voltage controlled oscillator in a phase lock loop circuit, thereby producing the FM transmit signal. During signal reception, the oscillator output, in the form of the transmitted FM signal, is received via the receive antenna along with an FM receive signal for mixing therewith to down-convert the FM receive signal. As part of the demodulation of the down-converted FM receive signal, the binary transmit data is subtracted out.

Using a directly modulated local oscillator for both transmit and receive can present a problem. When the local oscillator is modulated to produce the transmit signal, this same local oscillator is also used to down-convert the receive signal to some convenient intermediate frequency (IF) for filtering and amplification. Thus, the modulation signal used for transmitting also appears in the receive signal, and is detected. In an analog FM voice system, the user hears his own voice as a one hundred percent echo, that is, at the same volume as the far end detected signal. This large radio echo is not acceptable to the users.

It is the object of the present invention to provide an improved transceiver architecture which is most applicable to cordless telephones, cellular phones and other systems in which a transmit local oscillator is phase or frequency modulated to generate the transmit signal and in which the same local oscillator is used to down-convert the receive signal, yet echo is suppressed.

SUMMARY OF THE INVENTION

The above object has been achieved by a wireless transceiver which uses compensating filtering to negate filter artifacts affecting the transmit echo signal, so it can be more accurately subtracted. The compensator is a filter and optionally an amplitude compensator which approximately duplicates the filtering effects of the phase lock loop circuitry on a modulated VCO on the transmit side of the transceiver and the effects of IF filtering on the receive side which would delay and distort the receive signal. Then, the compensator signal is added or subtracted, depending on phase, from the receive signal at the baseband audio level so that the receive signal is free from transmit echo artifacts. In the absence of the compensation filter, the subtraction of the transmit echo is much less effective, or almost absent in some cases.

The utility of the transceiver of the present invention has nearly the minimum RF circuitry which can satisfy most governmental (FCC) requirements for cordless telephones, while having good audio quality.

BEST MODE FOR CARRYING OUT THE INVENTION

Figure 1:
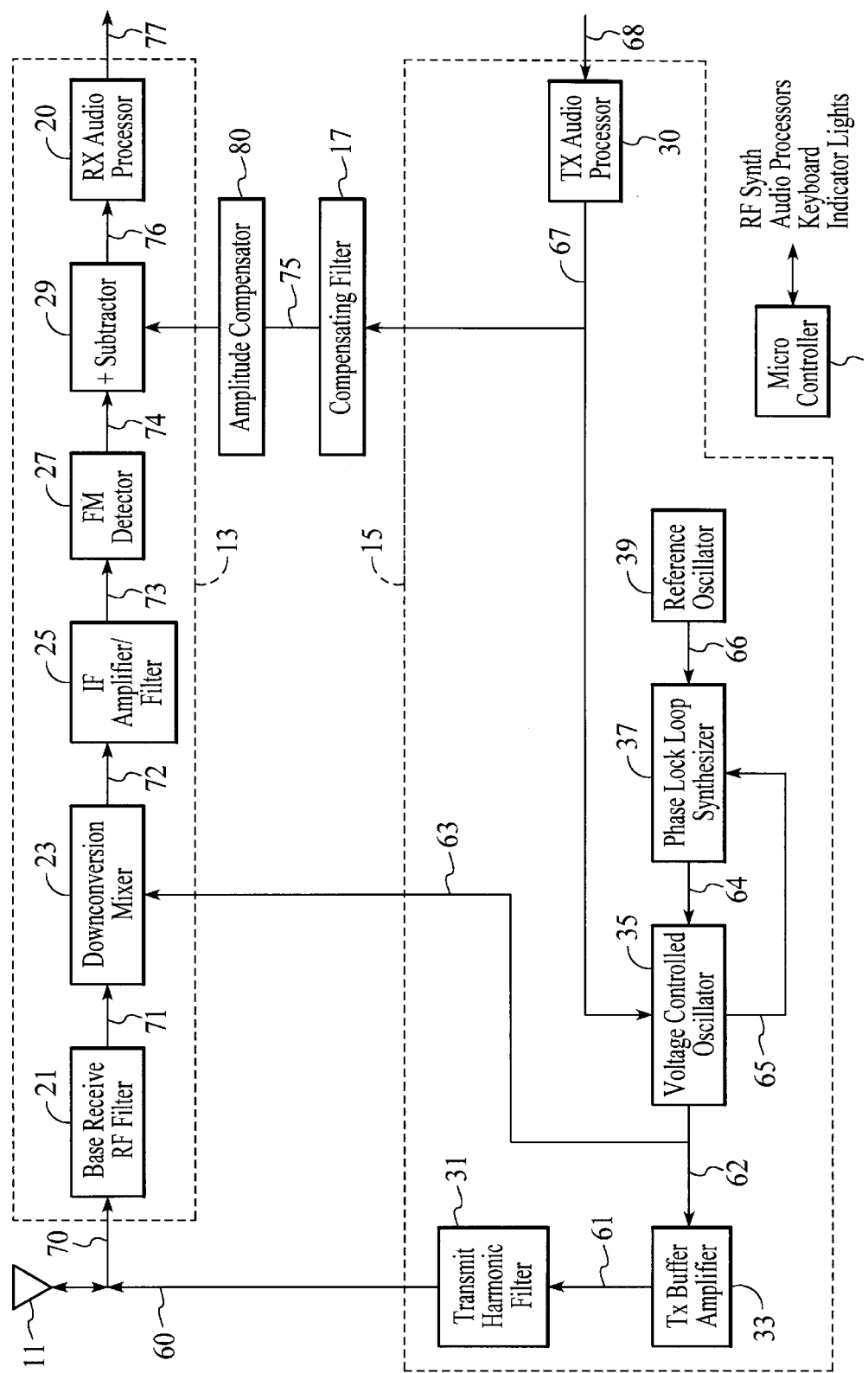
FIG. 1 is a block diagram of a wireless transceiver of the present invention.

With reference to FIG. 1, a wireless transceiver of the present invention is seen to have a receive side 13 and a transmit side 15. An antenna 11 is used to both transmit modulated radio frequency (RF) signals and to receive modulated RF signals. When the transceiver receives a modulated RF signal, the receive signal 70 proceeds to the receiver side 13 consisting of an RF amplifier which incorporates a base receive RF filter 21, then to a down-conversion mixer 23, an intermediate frequency (IF) amplifier and filter 25, an FM detector 27, a subtractor 29 and a receive audio processor 20.

The outgoing signals that are transmitted through antenna 11 are generated from the transmitter side 15 which is a direct FM or phase modulated transmitter consisting of a transmit audio processor 30, a phase lock loop circuit including a voltage controlled oscillator (VCO) 35, a phase lock loop synthesizer 37 and a reference oscillator 39, a transmit buffer amplifier 33 and a transmit harmonic filter 31. A compensating filter 17 is connected between the transmitter circuit 15 and the receiver circuit 13. The compensating filter 17 compensates for frequency distortion in the demodulator of the receive circuit 13 and also for such distortion of the transmit modulation as may occur in the VCO 35 and synthesizer 37 of the phase lock loop circuit and will be described in more detail below. Additionally, an amplitude compensator 80 is also connected between the compensating filter 17 and the receiver circuit 13. The amplitude compensator 80 compensates for amplitude distortion in the demodulator of the receiver circuit 13. A microcontroller 40 interfaces with the audio processors of the transceiver, as well as with keyboards, indicator lights, and other peripheral devices, to provide the function of process control.

The RF filter 21 is a wide band filter acting on the receive signal 70 to reduce incoming signal noise, spurious signals and to reduce the power in the transmitter signal which reaches the receiver. The filtered signal 71 proceeds to a down-conversion mixer 23 where the output signal from VCO 35 is mixed with the RF signal from RF filter 21 to produce the intermediate frequency (IF) signal. The IF signal 72 is amplified by IF amplifier/filter 25 and the amplified signal 73 proceeds to a FM detector 27, or alternatively a phase demodulator in the case of phase modulation, which demodulates the IF signal. The IF filter is typically a narrow band filter having a significant effect on the IF signal. Therefore, the IF filter is modeled and taken into account in the compensating filter of the present invention, but the RF filter, having a smaller distortion effect is not modeled or taken into account. The demodulator has a characteristic filter function which may also be modeled, taking into account frequency and amplitude distortion.

The demodulated signal 74, now at the audio baseband level, proceeds to a subtractor circuit 29, in which the demodulated signal 74 is summed differentially with the signal 75 from the compensating filter 17. The objective of the subtractor circuit 29 is to remove the transmit modulation from the receive signal, so one must pay attention to phasing as well as frequency response. For example, if the local oscillator 35 has its frequency increased when the transmit modulation voltage increases, and then the down-conversion mixer 23 has the local oscillator lower in frequency than the receive signal, then the mixer 23 inverts the local oscillator 35 frequency at its output 72. Therefore, when the transmit modulation increases then the IF frequency 72 and 73 decreases. Next, the phasing of the FM Detector 27 must be considered. For explanatory purposes, let us assume the output of the FM Detector 74 increases when the IF frequency 73 increases. Now we finally have the subtractor receive input 74 decreases when the transmit modulation increases. In this particular case, if the compensating filter 17 has no inversion then the subtractor needs to add the two signals 74 and 75 together to achieve cancellation. To reduce confusion we refer to the cancellation block 29 as a subtractor because it cancels the signal 75 which also appears on signal 74, but we have seen above that each design implementations must determine whether the subtractor needs to add or to subtract the signals to achieve cancellation. Following frequency compensation is an amplitude compensation 80 which offsets amplitude distortion modeled in the demodulator circuit.

The difference signal 76 then proceeds to the receive audio processor 20. In the case of analog voice modulation, the audio processor generally includes a compandor circuit, which improves the signal-to-noise ratio by compressing the volume range of the voice signal at transmitter by means of a compressor, and restores the normal range at the receiving end with an expander. In addition, the voice signal will typically also be filtered, to prevent undesirable modulation frequency range in transmit, and limited to prevent excessive modulation level in transmit. The receive audio will typically be filtered to eliminate noise lying outside the voice frequency range. It may also include gain or volume control. For data, typically no audio processor is used, or a much simpler one than for voice. If the voice signal has been digitized by a vocoder, then typically the audio processor will consist simply of pulse shaping filters in transmit and noise-bandwidth control filters in receive.

The base receive RF filter 21, down-converter mixer 23, IF amplifier/filter 25, FM detector 27 and subtractor circuit 29 can all be implemented in a conventional manner as is known in the art. The receive audio processor 20 can be implemented by any of a number of audio processors as may be suitable for the analog or digital signal.

For signals that are to be transmitted, the analog voice or digital data signal 68 proceeds to a transmit audio processor 30 which processes the transmit modulation into a transmit baseband signal 67 which is input into the compensating filter 17 and also into the voltage controlled oscillator 35. The phase lock loop synthesizer 37 has an input 66 from a stable reference oscillator 39 and a feedback input 65 from the voltage controlled oscillator 35. If there is no input signal to the system, the error voltage is the value required for phaselock. Then, the voltage controlled oscillator (VCO) 35 operates at a carrier frequency, fo. When the transmit modulation signal 67 is applied, the VCO frequency control output signal 62 is modulated, but filtered by the phase lock loop 37. In other words, while the modulation signal 67 tends to swing the VCO center frequency, the PLL attenuates the swing with a filter characteristic that can be modeled with known programs, but the VCO is nevertheless modulated outside of the loop bandwidth. Inside the PLL bandwidth, the modulation is reduced. It is this RF signal 62 that is transmitted via the transmitter antenna. The frequency modulated RF signal 62 proceeds through an output buffer amplifier 33 and a harmonic filter 31 before proceeding to the antenna 11 for transmission. As in the receive circuit, the component blocks of the transmitter circuit 15, such as the VCO 35, the phase lock loop synthesizer 37, the reference oscillator 39, and the buffer amplifier 33 and harmonic filter 31 can all be implemented in a conventional manner as is known in the prior art. The transmit audio processor 30, can be the same type of processor as described above with reference to the receive audio processor 20, typically consisting of a compressor, a clipper and a filter for analog voice applications.

As discussed above, the compensating filter 17 is connected between the transmit audio processor 30 of the transmitter circuit 15 and the subtractor 29 of the receiver circuit 13. The compensating filter 17 serves to modify the frequency and phase spectrum of transmit modulation 67 so that it will be a good match to the receive signal 74 component of transmit modulation, thus allowing this signal to be accurately removed to give an uncontaminated receive signal 76. For the purposes of explanation of the compensating filter circuit, a typical phase lock loop circuit has a bandwidth of about 150 Hz and a phase lock loop lead of zero at 10 Hz. These values would incorporate a well damped phase lock loop circuit. These assumptions mean that the phase lock loop affects the modulation signals by subjecting it to a single highpass effect below 150 Hz and a double highpass effect below 10 Hz. Therefore, the compensating filter should reflect the same behavior, so that the subtractor will completely eliminate any transmit audio signals from the receive signal.

The receiver also has some filtering, mainly in the IF amplifier/filter, and this has an effect on the audio signal. For the purposes of illustration, suppose that the IF filtering of the receiving circuit has the effect of lowpassing the audio signal with a two pole response at 10 KHz. Therefore, the compensating filter would need to compensate the modulation signal before it reaches the subtractor so that the output signal from the subtractor is correct.

Figure 2:
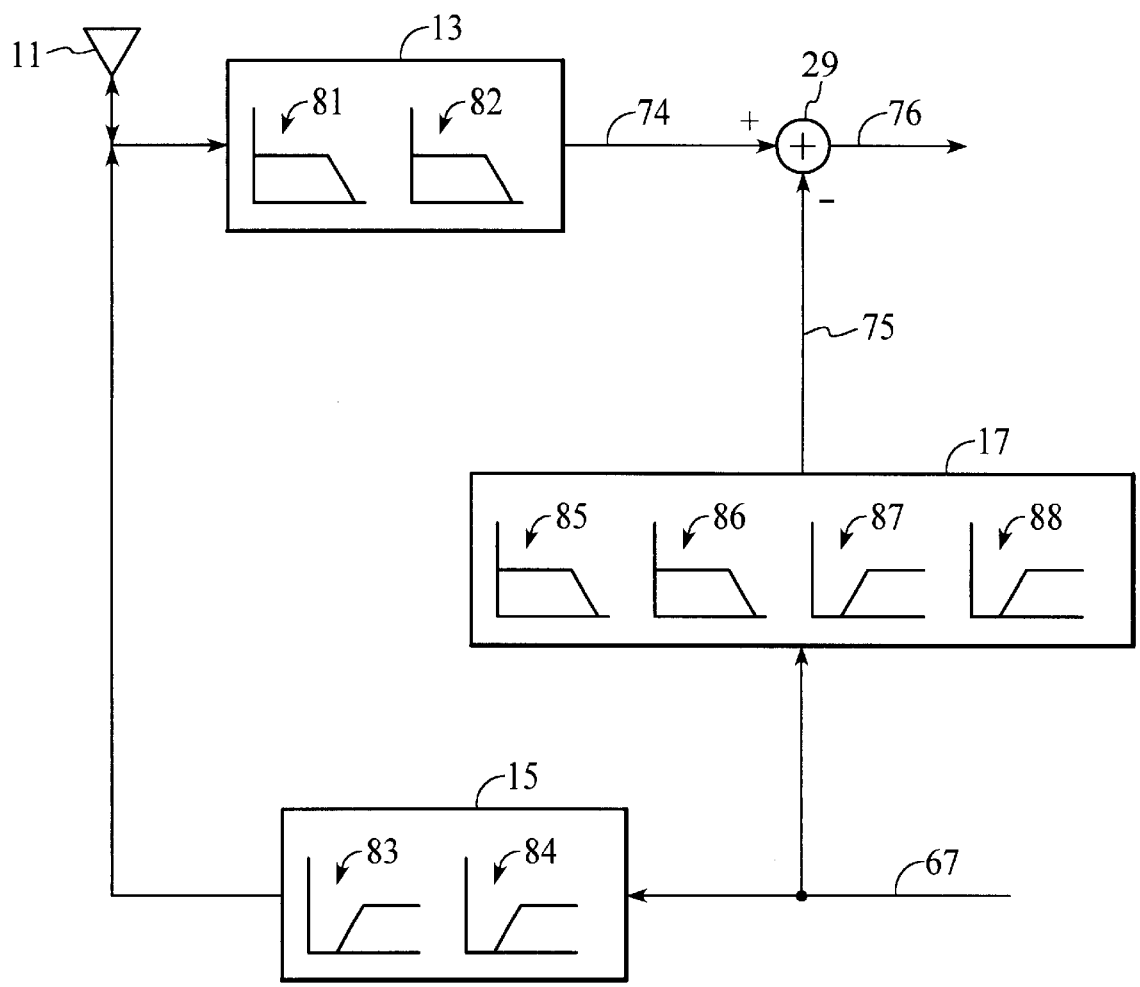
FIG. 2 is a diagram illustrating the frequency response of circuits in the transmit and receive sides of the transceiver of FIG. 1.

With reference to FIG. 2, the compensating filter 17 must compensate for both the effects of phase lock loop circuit in the transmitter circuit 15 and the effects of the filtering in the receiver circuit 25. Usually the filtering effects of the RF filter 13 on the baseband receive are unimportant because the RF filter is quite wide compared to the baseband signal bandwidth. As discussed in the example above, the phase lock loop circuit may have a single highpass effect below 150 Hz, and a double highpass effect below 10 Hz. This is represented in FIG. 2 by a pair of highpass filters 83 and 84 in the transmitter circuit 15. Also, as discussed above, the IF filtering in the receiver circuit may have the effect of lowpassing the audio signal with a two pole response at 10 KHz. This is represented in FIG. 2 by a pair of lowpass filters 81, 82 in the receiver circuit 13.

In order to achieve a pure receive signal 76 at the output of the subtractor 29, the compensating filter 17 must compensate for both the highpass effects of the transmitter circuit 15 and the lowpass effects of the receiver circuit 25. Thus, in FIG. 2, the compensating filter circuit 17 is shown to include two highpass filters 85 and 86 and two lowpass filters 87 and 88. The number of highpass and lowpass effects described in conjunction with FIG. 2 is merely exemplary and the precise compensating filter characteristic is determined by modeling the PLL filter effect on the VCO output signal 62 combined with the IF filter effect on the mixer output signal 72. The compensating filter is the same as this composite. The various subcircuits of the transmitter and receiver circuits may have other filter effects which may be modeled and matched by the compensating filter circuit.

Figure 3:
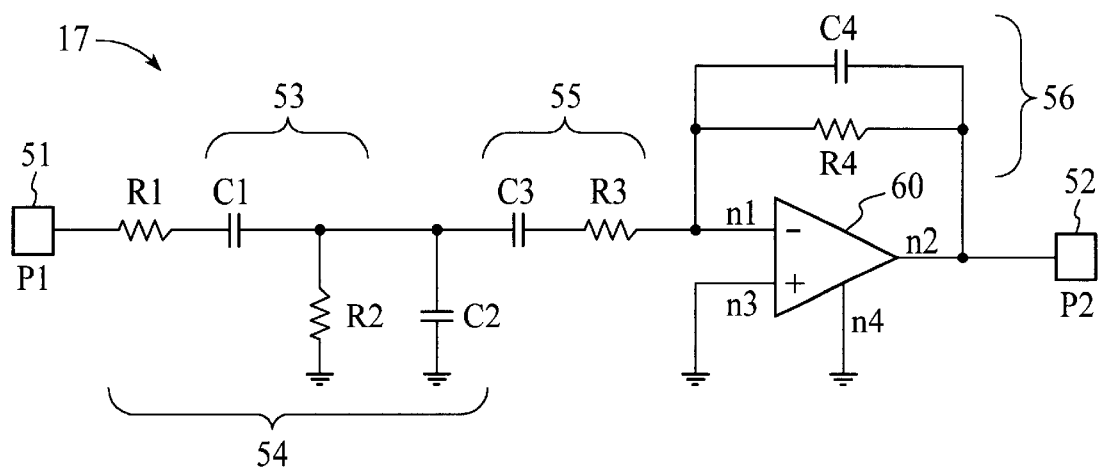
FIG. 3 is an electrical schematic diagram of a compensating filter circuit used in the transceiver of FIG. 1.

With reference to FIG. 3, an example of the compensating filter 17 is shown. Note that the embodiment of the filter shown in FIG. 3 is just one construction that could be used to implement the compensating filter 17. Many other implementations of the filter can be made which would accomplish the same function, namely to eliminate the transmit audio signal from the receive signal. In the circuit 17 of FIG. 3, the input node 51 receives the transmit audio signal from the transmit audio processor of the transmitting circuit. A resistor R1 and capacitor C1 are connected in series to input node 51. A resistor R2 is connected between one end of capacitor C1 and ground. A capacitor C2 is connected in parallel with resistor R2 between the end of capacitor C1 and ground. Capacitor C3 is connected after resistor R2 and capacitor C2, in series between capacitor C1 and a resistor R3. The second end of resistor R3 is connected to the negative input terminal N1 of operational amplifier 60. The positive input terminal N3 of operational amplifier 60 is connected to ground. Resistor R4 and capacitor C4 are connected in parallel between negative input terminal N1 and the output terminal N2 of operational amplifier 60. The output terminal N2 is connected to the output node 52 of the compensating filter circuit. The output node 52 of the compensating filter circuit 17 is connected to the subtractor of the receive circuit of the transceiver.

As discussed above with regard to FIG. 2, a typical phase lock loop has a bandwidth of about 150 Hz and a phase lock loop lead zero at 10 Hz, which would mean that the phase lock loop affects the modulation signal by subjecting it to a single highpass effect below 150 Hz and a double highpass effect below 10 Hz. Therefore, the compensating filter of FIG. 3 should reflect the same behavior, so that the subtractor will completely eliminate any transmit audio signals from the receive signal. Thus, with reference to FIG. 3, capacitor C1, having a value of 22 nF, forms a highpass filter 53 with resistor R2, which has a resistance of 1 MΩ. Additionally, capacitor C3, having a capacitance of 22 nF, forms a second highpass filter 55 with resistor R3, which has a resistance of 100 KΩ.

The receive side also has some filtering, mainly in the IF stage, and this has an effect on the audio signal. As discussed in the example above, suppose that the filtering of the receiving circuit has the effect of lowpassing the audio signal with a two pole response at 10 KHz. Therefore, the compensating filter would need to compensate for this low pass effect. In the circuit of FIG. 3, resistor R1, having a resistance of 10 KΩ, forms a lowpass filter 54 with capacitor C2, which has a capacitance of 1.5 nF. Additionally, resistor R4, having a resistance of 100 KΩ, and capacitor C4, having a capacitance of 150 pF, form a second lowpass filter 56. The two lowpass filters have the effect of matching the effects of any significant IF filtering from the receive circuit, while the highpass filters 53 and 55 have the effect of matching any effects of the phase lock loop circuit in the transmit audio.

Figure 4:
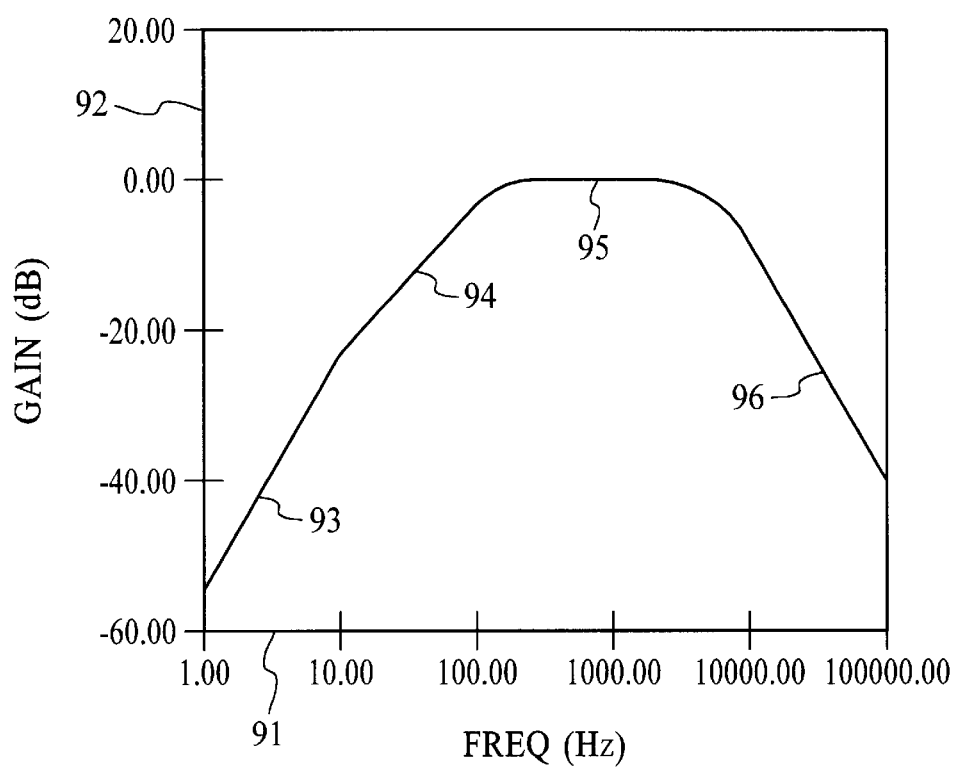
FIG. 4 is a graph of gain vs. frequency for the compensating filter circuit of FIG. 3.

With reference to FIG. 4, a graph of the effects of the compensating filtering is shown. The graph illustrates the signal gain in decibels (dB) on the Y axis 92 and the frequency (Hz) on a logarithmic scale on the X axis 91. In a portion of a graph 94 between 10 and 150 Hz, there is a 20 dB per decade highpass slope. This is due to the effects of the highpass filter 55. In the portion of the graph 93 below 10 Hz, there is a slope of 40 dB per decade highpass slope, which is due to the combination of the highpass filters 53 and 55. The portion of the graph 95 above 150 Hz is shown to have a slope of 0 dB until the frequency reaches 10 KHz in which the two pole response from the IF filtering needs to be compensated. At this point, the lowpass filters 54 and 56 cause a portion of the graph 96 above 10 KHz to have a lowpass slope of 40 dB per decade.

Various implementations of the compensating filter and amplitude compensator can be constructed based upon well known engineering models of filters. Such models are used to combine the filtering effects of the phase lock loop circuitry on the transmit side and the receive side IF filtering, as well as amplitude distortion in the detector circuit.

What is claimed is:

1. A wireless transceiver comprising,
   a transmit side having a voltage controlled oscillator (VCO) generating a radio frequency (RF) signal, the VCO having a center frequency stabilized by a reference circuit, with the center frequency swung by a modulation signal from a baseband modulation signal source, the reference circuit imposing a characteristic filter function on the RF signal producing a modulated RF output signal, and
   a receive side having a down-conversion mixer combining an RF input signal with the modulated RF output signal, producing an intermediate frequency (IF) signal fed to an IF amplifier and filter having a characteristic filter function operating on the IF signal, thereby producing a filtered IF signal, a detector circuit connected to receive the filtered IF signal and produce a demodulated audio signal, and a subtractor circuit connected to receive the demodulated audio signal, and
   a compensating filter having an output connected to the subtractor circuit and having a filter function which is the same as a composite of the characteristic filter function of the RF output signal and the characteristic filter function of the IF amplifier and filter, the input of the compensating filter arranged to receive the modulation signal and apply the complement signal thereto, thereby removing the transmit modulation from the received demodulated audio signal.

2. The apparatus of claim 1 wherein said reference circuit is a phase lock loop.

3. The apparatus of claim 1 further comprising an amplitude compensator associated with the compensating filter and having an amplitude attenuation characteristic applied to the subtractor circuit which is the same as distortion in the detector circuit.

4. The apparatus of claim 1 wherein said receive side has an input connected to an RF amplifier and filter with the output thereof being said RF input signal.

5. The apparatus of claim 1 wherein said filter function is a linear combination of the characteristic filter function of the RF output signal and the characteristic filter function of the IF amplifier and filter.

6. A transceiver for transmitting and receiving radio frequency (RF) signals, comprising:

an antenna for transmitting a first modulated RF signal and receiving a second modulated RF signal, a transmitter circuit coupled to the antenna and generating the first RF signal, the transmitter circuit including a modulator for modulating a first RF signal with a transmit audio signal, the transmitter circuit including a phase locked voltage controlled oscillator (VCO) with a characteristic filter passband associated with the VCO output signal sent to the antenna, a receiver circuit coupled to the antenna and receiving the second RF signal, the receiver circuit having a down-converting mixer, and an IF amplifier and filter with an input being the VCO output signal, an output of the mixer having a first frequency response and a demodulator circuit for converting the first frequency response to a baseband signal, the demodulator circuit connected to a subtractor circuit, and a compensating filter circuit coupled between the VCO of the transmitter circuit and the subtractor circuit of the receiver circuit and having a second frequency response that is the same as the first frequency response, wherein the first frequency response signal is combined with the second frequency response signal, thereby accurately removing the transmit modulation from the baseband signal of the receiver circuit.

7. The transceiver of claim 6 wherein the transmitter circuit includes a phase lock loop (PLL) synthesizer coupled to the VCO, the PLL synthesizer having a third frequency response.

8. The transceiver of claim 6 wherein the compensating filter circuit comprises at least one highpass filter.

9. The transceiver of claim 1 wherein the compensating filter circuit comprises at least one each of highpass and lowpass filters.

10. The transceiver of claim 6 wherein the compensating filter comprises at least one highpass filter connected in series with at least one lowpass filter.

11. The transceiver of claim 6 wherein the VCO of the transmitter circuit is directly modulated with a baseband audio signal.

12. The apparatus of claim 6 further comprising an amplitude compensator associated with the compensating filter and having an amplitude attenuation characteristic applied to the subtractor circuit which is the same as the amplitude distortion in the demodulated audio signal.

* * * * *